United States Patent
Tian et al.

(10) Patent No.: US 10,878,247 B2
(45) Date of Patent: Dec. 29, 2020

(54) METHOD AND APPARATUS FOR GENERATING INFORMATION

(71) Applicants: Baidu.com Times Technology (Beijing) Co., Ltd., Beijing (CN); Baidu USA LLC, Sunnyvale, CA (US)

(72) Inventors: Hao Tian, Sunnyvale, CA (US); Xi Chen, Sunnyvale, CA (US); Jeff ChienYu Wang, Sunnyvale, CA (US); Daming Lu, Sunnyvale, CA (US)

(73) Assignees: Baidu.com Times Technology (Beijing) Co., Ltd., Beijing (CN); Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 16/702,886

(22) Filed: Dec. 4, 2019

(65) Prior Publication Data
US 2020/0320306 A1 Oct. 8, 2020

(30) Foreign Application Priority Data
Apr. 8, 2019 (CN) .......................... 2019 1 0277783

(51) Int. Cl.
H04N 9/80 (2006.01)
G06K 9/00 (2006.01)
G10L 13/00 (2006.01)
H04N 5/93 (2006.01)

(52) U.S. Cl.
CPC ..... *G06K 9/00731* (2013.01); *G06K 9/00765* (2013.01); *G10L 13/00* (2013.01)

(58) Field of Classification Search
CPC . G06K 9/00731; G06K 9/00765; G10L 13/00
USPC ................ 386/241, 278, 239, 244, 281, 282
See application file for complete search history.

(56) References Cited

U.S. PATENT DOCUMENTS

| | | | |
|---|---|---|---|
| 2015/0149600 A1* | 5/2015 | Thibeault | H04L 67/22 709/219 |
| 2017/0019719 A1* | 1/2017 | Neumeier | H04N 21/8456 |

* cited by examiner

*Primary Examiner* — Robert Chevalier
(74) *Attorney, Agent, or Firm* — Knobbe, Martens, Olson & Bear, LLP

(57) ABSTRACT

Embodiments of the present disclosure provide a method and apparatus for generating information. The method may include: determining at least one video segment obtained by semantically segmenting videos included in a target news cluster as a target video set, where respective pieces of news in the target news cluster directs to a given news event; determining a commentary for the target news cluster; determining, based on the target video set and a target image set, a candidate material resource set corresponding to the commentary, where the target image set is composed of respective images included in the target news cluster; and for each paragraph in the commentary, determining degrees of matching between the paragraph and candidate material resources in the candidate material resource set.

20 Claims, 13 Drawing Sheets

METHOD AND APPARATUS FOR GENERATING INFORMATION

CROSS-REFERENCE TO RELATED APPLICATIONS

This application claims priority to Chinese Patent Application No. 201910277783.0, filed with the China National Intellectual Property Administration (CNIPA) on Apr. 8, 2019, the content of which is incorporated herein by reference in its entirety.

TECHNICAL FIELD

Embodiments of the present disclosure relate to the field of computer technology, and specifically to a method and apparatus for generating information.

BACKGROUND

With the development of network technology, various types of news from all over the world can be released to users through various media. For a given news event, various media (such as news websites or news applications) may edit different news, and the focuses of the news released by different media may be different from each other, and the news that reports the given news event also has more or less coincident information.

A user may read a plurality of news reports in order to extract desired information, which results in low efficiency of gaining news. In order to help the user to improve the efficiency of gaining news, the plurality of news of the given news event are aggregated, redundant information in the multiple news is removed, and commentary for the news event is extracted.

SUMMARY

Embodiments of the present disclosure provide a method and apparatus for generating information.

According to a first aspect, some embodiments of the present disclose a method for generating information, the method including: determining at least one video segment obtained by semantically segmenting videos comprised in a target news cluster as a target video set, wherein respective pieces of news in the target news cluster direct to a given news event; determining a commentary for the target news cluster; determining, based on the target video set and a target image set, a candidate material resource set corresponding to the commentary, wherein the target image set is composed of respective images comprised in the target news cluster; and for each paragraph in the commentary, determining degrees of matching between the paragraph and candidate material resources in the candidate material resource set.

In some embodiments, the method further includes: determining a candidate material resource sequence corresponding to the paragraph in the commentary based on the degrees of matching between the paragraph in the commentary and the candidate material resources, playing durations of the candidate material resources, and a text length of the paragraph in the commentary; and generating a video corresponding to the commentary based on the candidate material resource sequences corresponding to paragraphs in the commentary.

In some embodiments, the method further includes: sending the video corresponding to the commentary to a terminal device, so that the terminal device presents the received video.

In some embodiments, the generating a video corresponding to the commentary based on the candidate material resource sequences corresponding to paragraphs in the commentary includes: for each paragraph in the commentary, generating a speech corresponding to the paragraph by using a speech synthesis technology; and generating the video corresponding to the commentary based on speeches corresponding to the paragraphs in the commentary and the candidate material resource sequences.

In some embodiments, the determining, based on the target video set and a target image set, a candidate material resource set corresponding to the commentary includes: combining the target video set and the target image set to obtain the candidate material resource set corresponding to the commentary.

In some embodiments, the determining, based on the target video set and a target image set, a candidate material resource set corresponding to the commentary includes: for each target video in the target video set, inputting the target video into a pre-trained vivid video detecting model to obtain a vivid video detecting result corresponding to the target video, wherein the vivid video detecting model is used to characterize a corresponding relationship between a video and a vivid video detecting result for characterizing whether the video is a vivid video; deleting a target video corresponding to a vivid video detecting result for characterizing a non-vivid video from the target video set; and combining the target video set and the target image set to obtain the candidate material resource set corresponding to the commentary.

In some embodiments, after deleting a target video corresponding to a vivid video detecting results for characterizing a non-vivid video from the target video set, the method further includes: deleting a video with a playing duration shorter than a preset shortest candidate video duration from the target video set.

In some embodiments, the determining, for each paragraph in the commentary, degrees of matching between the paragraph and candidate material resources in the candidate material resource set includes: for each paragraph in the commentary, determining a semantic vector corresponding to the paragraph; for each candidate material resource in the candidate material resource set, determining a semantic vector corresponding to the candidate material resource; and determining a similarity between a semantic vector corresponding to a paragraph in the commentary and a semantic vector corresponding to a candidate material resource in the candidate material resource set as a degree of matching between the paragraph and the candidate material resource.

In some embodiments, the determining, for each candidate material resource in the candidate material resource set, a semantic vector corresponding to the candidate material resource includes: semantically segmenting, in response to determining that the candidate material resource is an image, the image candidate material resource to obtain at least one semantic labeling result corresponding to the image candidate material resource, and determining the semantic vector corresponding to the candidate material resource based on semantic vectors corresponding to semantic labeling results among the obtained at least one semantic labeling result; down sampling, in response to determining that the candidate material resource is a video, the video candidate material resource to obtain at least one sample image; for each sample image in the at least one sample image, semantically segmenting the sample image to obtain at least one semantic labeling result corresponding to the sample image, and determining a semantic vector corresponding to the sample image based on semantic vectors corresponding to semantic labeling results among the obtained at least one semantic labeling result; and determining the semantic vector corresponding to the candidate material resource based on semantic vectors corresponding to sample images.

In some embodiments, the determining the semantic vector corresponding to the candidate material resource based on the semantic vectors corresponding to sample images includes: determining a mean vector of the semantic vectors corresponding to the respective sample images as the semantic vector corresponding to the candidate material resource.

In some embodiments, the determining the semantic vector corresponding to the candidate material resource based on the semantic vectors corresponding to sample images includes: determining a vector corresponding to medians of values at respective dimensions of the semantic vectors corresponding to the respective sample images as the semantic vector corresponding to the candidate material resource.

According to a second aspect, some embodiments of the present disclosure provide an apparatus for generating information, the apparatus including: a semantic segmentation unit, configured to determine at least one video segment obtained by semantically segmenting videos comprised in a target news cluster as a target video set, wherein respective pieces of news in the target news cluster direct to a given news event; a commentary determining unit, configured to determine a commentary for the target news cluster; a candidate material resource set determining unit, configured to determine, based on the target video set and a target image set, a candidate material resource set corresponding to the commentary, wherein the target image set is composed of respective images comprised in the target news cluster; and a matching degree determining unit, configured to determine, for each paragraph in the commentary, degrees of matching between the paragraph and each candidate material resources in the candidate material resource set.

In some embodiments, the apparatus further includes: candidate material resource sequence determining unit, configured to determine a candidate material resource sequence corresponding to the paragraph in the commentary based on the degrees of matching between the paragraph in the commentary and the candidate material resources, playing durations of the candidate material resources, and a text length of the paragraph in the commentary; and a video generating unit, configured to generate a video corresponding to the commentary based on the candidate material resource sequences corresponding to paragraphs in the commentary.

In some embodiments, the apparatus further includes: a video sending unit, configured to send the video corresponding to the commentary to a terminal device, so that the terminal device presents the received video.

In some embodiments, the video generating unit includes: a speech synthesis module, configured to generate, for each paragraph in the commentary, a speech corresponding to the paragraph by using a speech synthesis technology; and a video generating module, configured to generate the video corresponding to the commentary based on speeches corresponding to the paragraphs in the commentary and the candidate material resource sequences.

In some embodiments, the candidate material resource set determining unit is further configured to: combine the target video set and the target image set to obtain the candidate material resource set corresponding to the commentary.

In some embodiments, the candidate material resource set determining unit is further configured to: input, for each target video in the target video set, the target video into a pre-trained vivid video detecting model to obtain a vivid video detecting result corresponding to the target video, wherein the vivid video detecting model is used to characterize a corresponding relationship between a video and a vivid video detecting result for characterizing whether the video is a vivid video; delete a target video corresponding to a vivid video detecting result for characterizing a non-vivid video from the target video set; and combine the target video set and the target image set to obtain the candidate material resource set corresponding to the commentary.

In some embodiments, the candidate material resource set determining unit is further configured to: delete a video with a playing duration shorter than a preset shortest candidate video duration from the target video set, after deleting a target video corresponding to a vivid video detecting results for characterizing a non-vivid video from the target video set.

In some embodiments, the matching degree determining unit includes: a paragraph semantic vector determining module, configured to determine, for each paragraph in the commentary, a semantic vector corresponding to the paragraph; a candidate material resource semantic vector determining module, configured to determine, for each candidate material resource in the candidate material resource set, a semantic vector corresponding to the candidate material resource; and a matching degree determining module, configured to determine a similarity between a semantic vector corresponding to a paragraph in the commentary and a semantic vector corresponding to a candidate material resource in the candidate material resource set as a degree of matching between the paragraph and the candidate material resource.

In some embodiments, the candidate material resource semantic vector determining module is further configured to: semantically segment, in response to determining that the candidate material resource is an image, the image candidate material resource to obtain at least one semantic labeling result corresponding to the image candidate material resource, and determine the semantic vector corresponding to the candidate material resource based on semantic vectors corresponding to each semantic labeling result among the obtained at least one semantic labeling result; down sample, in response to determining that the candidate material resource is a video, the video candidate material resource to obtain at least one sample image; for each sample image in the at least one sample image, semantically segmenting the sample image to obtain at least one semantic labeling result corresponding to the sample image, and determine a semantic vector corresponding to the sample image based on semantic vectors corresponding to semantic labeling results among the obtained at least one semantic labeling result; and determine the semantic vector corresponding to the candidate material resource based on semantic vectors corresponding to sample images.

In some embodiments, the determining the semantic vector corresponding to the candidate material resource based on the semantic vectors corresponding to sample images includes: determining a mean vector of the semantic vectors corresponding to the respective sample images as the semantic vector corresponding to the candidate material resource.

In some embodiments, the determining the semantic vector corresponding to the candidate material resource based on the semantic vectors corresponding to sample images includes: determining a vector corresponding to medians of values at respective dimensions of the semantic vectors corresponding to the respective sample images as the semantic vector corresponding to the candidate material resource.

According to third aspect, some embodiment of the present disclosure provide a server, including: one or more processors; and a storage apparatus, storing one or more programs, the one or more programs, when executed by the one or more processors, causing the one or more processors to implement the method according to any one of the implementations in the first aspect.

According to a fourth aspect, some embodiments of the present disclosure provide a computer-readable storage medium, storing a computer program thereon, wherein the computer program, when executed by one or more processors, causes the one or more processors to implement the method according to any one of the implementations in the first aspect.

According to a fifth aspect, some embodiments of the present disclosure provide another server, including: an interface; a storage apparatus storing one or more programs thereon; and one or more processors operatively connected to the interface and the storage apparatus, configured to: determine at least one video segment obtained by semantically segmenting videos comprised in a target news cluster as a target video set, wherein respective pieces of news in the target news cluster direct to a given news event; determine a commentary for the target news cluster; determine, based on the target video set and a target image set, a candidate material resource set corresponding to the commentary, wherein the target image set is composed of respective images comprised in the target news cluster; for each paragraph in the commentary, determine degrees of matching between the paragraph and candidate material resources in the candidate material resource set.

According to a sixth aspect, some embodiments of the present disclosure provide a computer readable medium, storing a computer program thereon, wherein the computer program, when executed by one or more processors, causes the one or more processors to implement the following operations: determine at least one video segment obtained by semantically segmenting videos comprised in a target news cluster as a target video set, wherein respective pieces of news in the target news cluster direct to a given news event; determine a commentary for the target news cluster; determine, based on the target video set and a target image set, a candidate material resource set corresponding to the commentary, wherein the target image set is composed of respective images comprised in the target news cluster; for each paragraph in the commentary, determine degrees of matching between the paragraph and candidate material resources in the candidate material resource set.

In order to improve the efficiency of obtaining news by a user, in the prior art, a commentary is often generated for a news cluster in the prior art, and the user needs to read the commentary in text form to gain a news digest, and no corresponding video is generated for the commentary. According to the method and apparatus for generating information provided by the embodiments of the present disclosure, based on at least one video segment obtained by semantically segmenting videos included in a target news cluster and images included in the target news cluster, a candidate material resource set corresponding to a commentary of the target news cluster is determined, and degrees of matching between paragraphs in the commentary and candidate material resources in the candidate material resource set are calculated, thereby providing a data source for subsequently generating a corresponding video for the commentary of the target news cluster based on the candidate material resources, and then improving the degree of fit between the subsequently generated video corresponding to the commentary and the commentary. Moreover, in the prior art, during determining a candidate material resource corresponding to a text, the degree of matching between the material resource (for example, video or image) and the text is directly calculated, but in the method and apparatus for generating information according to the embodiments of the present disclosure, a video included in a target news cluster is first semantically segmented to obtain a target video set, then videos included in the target video set has separate semantics, so that when the degree of matching between a video in the target video set and a paragraph of the commentary is calculated, the accuracy of the calculated degree of matching can be improved, and the subsequently generated degree of fit between the subsequently generated video corresponding to the commentary and the commentary on a finer granularity can be further improved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
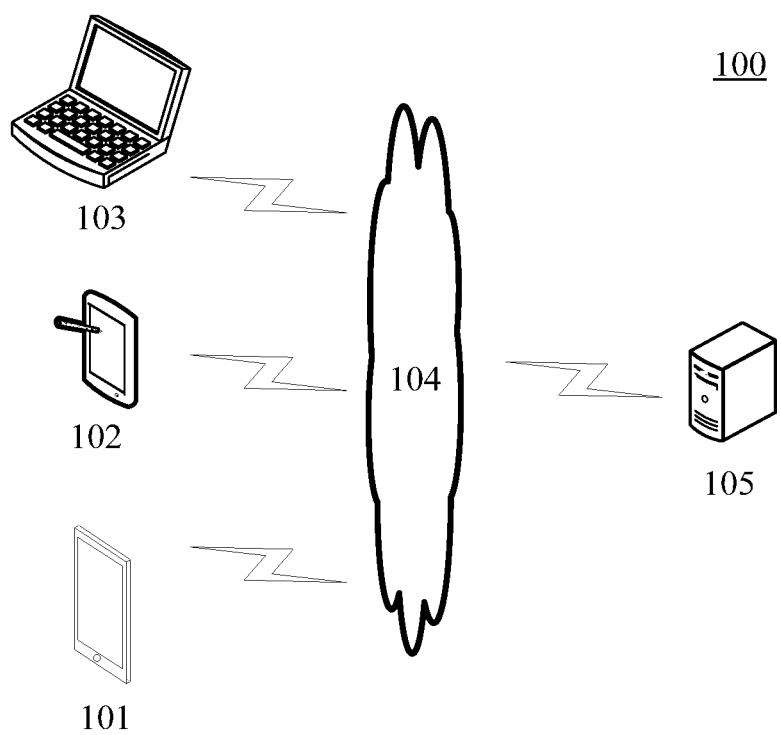
FIG. 1 is an architectural diagram of an example system to which some embodiments of the present disclosure may be applied.

FIG. 1 shows an example system architecture 100 to which a method for generating information or an apparatus for generating information may be applied.

As shown in FIG. 1, the system architecture 100 may include a terminal device 101, 102 or 103, a network 104, and a server 105. The network 104 serves as a medium providing a communication link between the terminal device 101, 102 or 103 and the server 105. The network 104 may include various types of connections, such as wired or wireless communication links, or optical fiber cables.

A user may interact with the server 105 using the terminal device 101, 102 or 103 through the network 104 to receive or send messages, etc. The terminal device 101, 102 or 103 may be installed with various communication client applications, such as web browser applications, shopping applications, search applications, instant messaging tools, e-mail clients, and social platform software.

The terminal device 101, 102 or 103 may be hardware or software. When the terminal device 101, 102 or 103 is hardware, the terminal device may be various types of electronic devices with display screens, including but not limited to a smart phone, a tablet computer, an e-book reader, an MP3 (Moving Picture Experts Group Audio Layer III) player, an MP4 (Moving Picture Experts Group Audio Layer IV) player, a laptop computer, a desktop computer, etc. When the terminal device 101, 102 or 103 is software, the terminal device may be installed in the above-listed electronic devices. The terminal device 101 may be implemented as a plurality of software programs or software modules, or as a single software program or software module. Specific limitations are not provided here.

The server 105 may be a server providing various services, for example, a backend website server providing a support for news websites displayed on the terminal device 101, 102 or 103. The backend website server may analyze and process the received data such as a news page request, and feed the processing result (e.g., news web page data) back to the terminal device 101, 102 or 103.

It should be noted that the method for generating information according to the embodiments of the present disclosure may be performed by the server 105. Accordingly, the apparatus for generating information may be provided in the server 105.

It should be noted that the server 105 may be hardware or software. When the server 105 is hardware, the server 105 may be implemented as a distributed server cluster composed of multiple servers, or as a single server. When the server 105 is software, the server 105 may be implemented as a plurality of software programs or software modules (e.g., for providing news web page services), or as a single software program or software module, which is not specifically limited herein.

It should be understood that the numbers of the terminal devices, the network and the server in FIG. 1 are merely illustrative. Any number of terminal devices, networks and servers may be provided based on actual requirements.

Further referring to FIG. 2, a flow 200 of a method for generating information according to an embodiment of the present disclosure is shown. The method for generating information includes the following steps.

Step 201: determining at least one video segment obtained by semantically segmenting each video included in a target news cluster as a target video set.

In the present embodiment, the executing body (for example, the server 105 shown in FIG. 1) of the method for generating information may first locally or remotely acquire the target news cluster from an electronic device connected to the executing body via a network. Here, the target news cluster is composed of at least one news direct at a given news event.

The news event refers to an event that occurred recently within a first preset time period (for example, within three months).

The news herein may refer to electronic data in various forms for the news event, and the news may be marked with a corresponding generation time. The news may include at least one of the following: text, image, audio, or video. For example, the news may be a web page or various documents, and the document may include at least one of the following: text, image, audio, or video. The news may also be just text, image or video. In practice, the obtained news may also be marked with a corresponding news event.

Then, the executing body may semantically segment videos in the respective news included in the target news cluster, to obtain at least one video segment, and determine the obtained video segments as a target video set.

It should be noted that how to semantically segment the video is the existing technology that has been widely studied and applied, and details are not described herein again.

Step 202: determining a commentary for the target news cluster.

In the present embodiment, the executing body (for example, the server shown in FIG. 1) may determine the commentary for the target news cluster by various implementations. The commentary may include at least one paragraph.

Figure 2A:
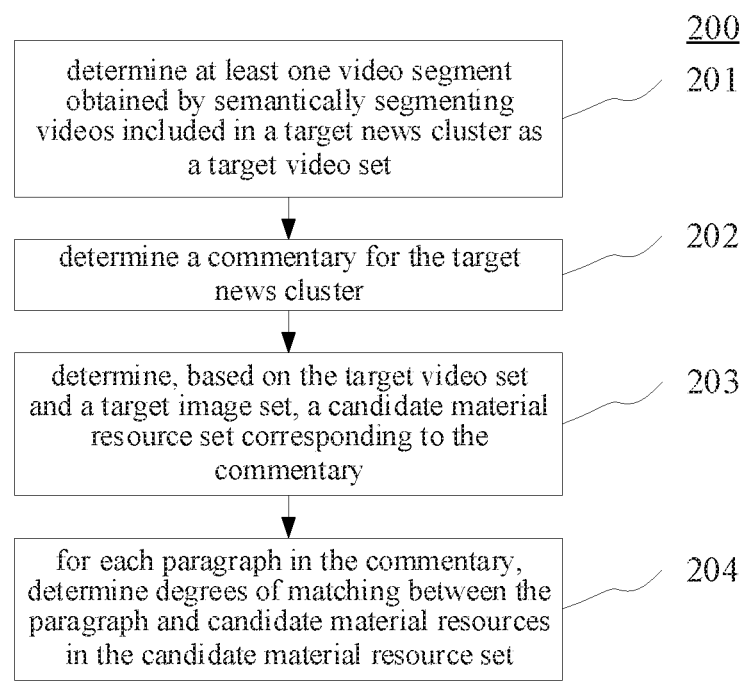
FIG. 2A is a flowchart of a method for generating information according to an embodiment of the present disclosure.
Figure 2B:
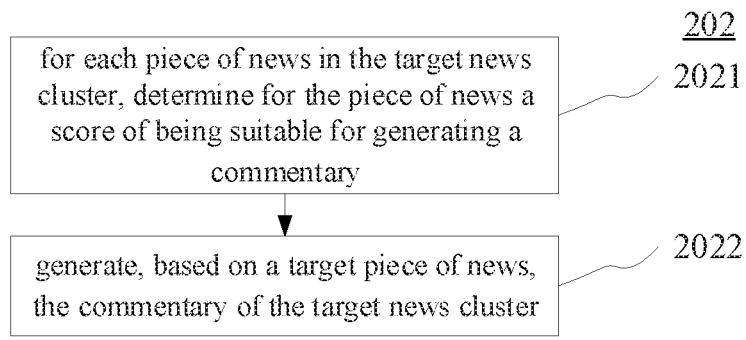
FIG. 2B is an exploded flowchart of step 202 according to an embodiment of the present disclosure.

In some alternative implementations of the present embodiment, step 202 may include step 2021 to step 2022 shown in FIG. 2B. Referring to FIG. 2B, an exploded flowchart of step 202 according to an embodiment of the present disclosure is shown.

Step 2021: for a piece of news in the target news cluster, determining for the piece news a score of being suitable for generating the commentary.

Here, the executing body may determine, for a piece of news in the target news cluster, a score of being suitable for generating the commentary for the piece of news by various implementations.

In some implementations, step 2021 may be performed as follows:

First, extracting a feature value of the pieces of news under at least one feature.

For example, at least one feature may include, but is not limited to, the following features: the number of characters included in a news, the number of different words included in a news, the number of images included in a news, the number of videos included in a news, the number of times that a news is read, the number of times that a news is forwarded, the sum of characters included in the respective pieces of news of the target news cluster, the sum of different words included in the respective pieces of news of the target news cluster, the sum of images included in the respective pieces of news of the target news cluster, the sum of videos included in the respective pieces of news of the target news cluster, the sum of times that the respective pieces of news in the target news cluster is read, and the sum of times that the respective pieces of news in the target news cluster is forwarded.

Second, based on the extracted at least one feature value, determining for the piece of news the score of being suitable for generating the commentary.

The score of being suitable for generating the commentary may be determined for the piece of news by various implementations based on the extracted at least one feature value.

For example, the extracted at least one feature value may be weighted and summed according to weights preset for the features, and the result of weighted summation may be determined as the score of being suitable for generating the commentary.

For another example, the following ratio may also be first determined:

(1) The ratio of the number of characters included in a news to the sum of characters included in the respective pieces of news of the target news cluster;

(2) The ratio of the number of different words included in a news to the sum of different words included in the respective pieces of news of the target news cluster;

(3) The ratio of the number of images included in a news to the sum of images included in the respective pieces of news of the target news cluster;

(4) The ratio of the number of videos included in a news to the sum of videos included in the respective pieces of news of the target news cluster;

(5) The ratio of the number of times that a news is read to the sum of times that the respective pieces of news in the target news cluster is read;

(6) The ratio of the number of times that a news is forwarded to the sum of times that the respective pieces of news in the target news cluster is forwarded.

Then, each of the ratios determined above may be weighted and summed according to the weights predetermined for the ratios, and the result of weighted summation may be determined as the score of being suitable for generating the commentary.

In some implementations, step 2021 may also be performed as follows.

The text included in the news is input into a pre-trained score calculation model, to obtain the score of being suitable for generating the commentary.

Here, the score calculation model is used to characterize a corresponding relationship between the text and the score of being suitable for generating the commentary for the piece of news.

As an example, the score calculation model may be a corresponding relationship table pre-created by a technician based on a large number of statistics performed on feature vectors obtained by performing feature extraction on the texts and labeling results of the scores of the texts being suitable for generating the commentary, the table storing corresponding relationships between a plurality of feature vectors and scores of the news being suitable for generating the commentary; or a calculation formula for performing numerical calculation on one or more values in the feature vectors obtained by feature extraction on the texts to obtain a score for characterizing that the text is suitable for generating the commentary, the calculation formula may be preset by a technician based on the statistics on a large amount of data and stored to the electronic device.

In some implementations, the electronic device may train the score calculation model in advance according to the following score calculation model training steps.

First, acquiring a set of first training samples.

A first training sample may include a text included in a historical news and a labeling score of the historical news being suitable for generating a commentary corresponding to the historical news. For example, the score of the historical news being suitable for generating the commentary may be labeled manually.

Second, determining a model structure of an initial score calculation model and initialize model parameters of the initial score calculation model.

In the present embodiment, the executing body of the score calculation model training steps may be the same as or different from the executing body of the method for generating information. If same, the executing body of the score calculation model training steps may store, after training the score calculation model, model structure information and model parameter values of the trained score calculation model locally. If different, the executing body of the score calculation model training steps may send, after training the score calculation model, model structure information and model parameter values of the trained score calculation model to the executing body of the method for generating information.

Since the score calculation model may include various types of calculation models, the model structure information that needs to be determined is different for different types of calculation models.

Alternatively, the initial score calculation model may include a convolutional neural network. The convolutional neural network is a multi-layer neural network, each layer consists of a plurality if two-dimensional planes, and each plane consists of a plurality of independent neurons, so it needs to be determined here which layers (e.g., convolutional layers, pooling layers, excitation function layers, etc.) an initial feature extraction model of a convolutional neural network type includes, in which order that the layers are connected, which parameters (e.g., a weight, a bias, and a step length of convolutions) each of the layers include, etc. The convolutional layers may be used to extract features. For each convolutional layer, how many convolution kernels, the sizes of each of the convolution kernels, the weights of the neurons in each of the convolution kernels, the biases corresponding to each of the convolution kernels, the step length between two adjacent convolutions, whether filling is required, how many pixels are filled and the values used for filling (usually the value used for filling is 0), and the like may be determined. The pooling layers may be used to down sample the input information, to compress the amount of data and parameters and reduce over-fitting. For each pooling layer, a pooling method (for example, taking a regional average or taking a regional maximum) for the pooling layer may be determined. The excitation function layers are used to perform nonlinear calculation on the input information. A specific excitation function may be determined for each excitation function layer. For example, the excitation may be a ReLU and various variant excitation functions of the ReLU, a Sigmoid function, a Tanh (hyperbolic tangent) function, a Maxout function, and the like.

Then, the model parameters of the initial score calculation model may be initialized. In practice, the model parameters of the initial score calculation model may be initialized with some different small random numbers. The "small random numbers" are used to ensure that the model would not enter saturation state due to oversize weights, which would cause training failure, and the "different" is used to ensure that the model can learn normally.

Next, the initial score calculation model is trained using a machine learning method, by using the texts included in the historical news in the first training sample in the set of first training samples and the scores of the historical news being suitable for generating a commentary respectively as inputs and desired outputs of the initial score calculation model.

Specifically, a text included in a historical news in the first training sample in the set of first training samples may be first input into the initial score calculation model, to obtain a score corresponding to the text included in the historical news. Then, the difference between the obtained score and the labeling score in the first training sample may be calculated. Finally, the model parameters of the initial score calculation model may be adjusted based on the calculated difference, and the training ends if a preset first training end condition is satisfied. For example, the preset first training end condition here may include at least one of the following: the training time exceeds a second preset time length, the number of trainings exceeds a first preset number, and the calculated difference is smaller than a first preset difference threshold.

The model parameters of the initial score calculation model may be adjusted by various implementations based on the difference between the obtained score and the labeling score in the first training sample. For example, stochastic gradient descent (SGD), a Newton's method, quasi-Newton methods, conjugate gradient, heuristic optimization, and other existing known or future developed various optimization algorithms may be used.

Finally, the trained initial score calculation model may be determined as a pre-trained score calculation model.

Step 2022: generating, based on a target news, the commentary of the target news cluster.

The scores of being suitable for generating a commentary of respective news in the target news cluster is determined in step 2021. Here, the executing body may first determine the news having the highest score of being suitable for generating a commentary in the target news cluster as the target news. Then, the commentary of the target news cluster is generated by various implementations based on the target news.

In some implementations, step 2022 may be performed as follows: performing digest extraction on the text included in the target news, and determining the digest text obtained by the digest extraction as the commentary of the target news cluster.

Figure 2C:
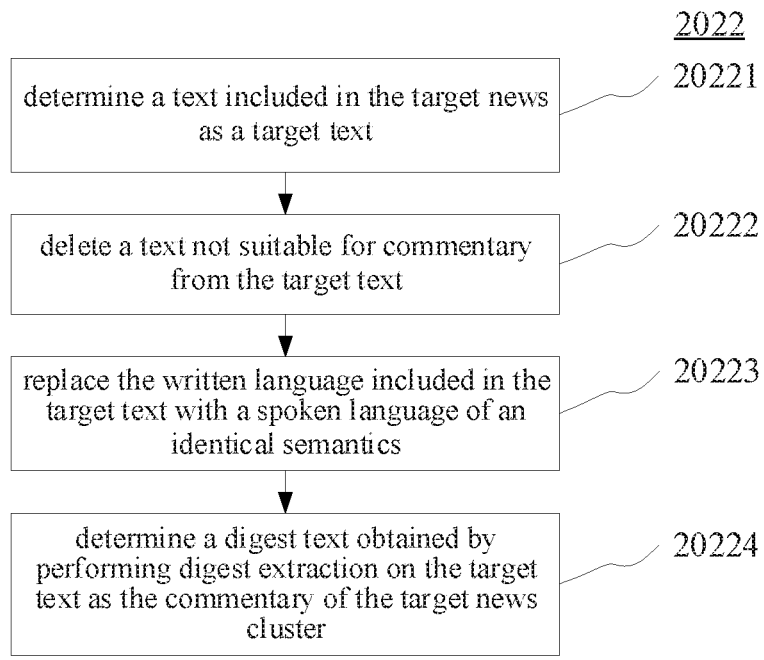
FIG. 2C is an exploded flowchart of step 2022 according to an embodiment of the present disclosure.

In some implementations, step 2022 may also include step 20221 to step 20224 as shown in FIG. 2C.

Referring to FIG. 2C, an exploded flowchart of step 2022 according to an embodiment of the present disclosure is shown.

Step 20221: determining the text included in the target news as a target text.

Here, the executing body may first determine the news having the highest score of being suitable for generating a commentary in the target news cluster as the target news. Then, the text included in the target news may be determined as the target text.

Step 20222: deleting a text unsuitable for a commentary from the target text.

Here, the executing body may delete the text unsuitable for commentary texts from the target text. The text unsuitable for commentary may be a text in a predetermined set of texts unsuitable for commentary. In practice, the set of texts unsuitable for commentary texts may be a set of texts pre-created by a technician based on the statistics on texts unsuitable for commentary (for example, "news from our reporter", "Please look at the picture above", "Please look at the picture below", "Reports from front reporters", "Big news from front reporters", "Reported by front reporters", "News reporters interviewed live audiences", etc.) extracted from a large amount of historical news.

After step 20222, invalid information in the target text may be reduced, and then the proportion of valid information in the commentary finally generated may be increased.

Step 20223: replacing the written language included in the target text with a spoken language of identical semantics.

Here, the executing body may replace the written language included in the target text with a spoken language of identical semantics by various implementations. The written language and the spoken language may be the ones in a predetermined written language and spoken language corresponding relationship table. In practice, the written language and spoken language corresponding relationship table may be a corresponding relationship table pre-created by a technician based on the statistics on written languages extracted from a large amount of corpus and spoken languages corresponding to the identical semantics.

After step 20223, the written language in the target text is replaced with the spoken language, so that the target text is more suitable for being used as a commentary.

Step 20224: determining the digest text obtained by performing digest extraction on the target text as the commentary of the target news cluster.

In some implementations, the executing body may directly determine the digest text obtained by extracting the digest from the target text as the commentary of the target news cluster.

In some implementations, step 20224 may also be performed as follows.

First, determining a maximum number of characters of the commentary according to a preset highest speech rate and a preset longest audio duration.

The preset highest speech rate is used to characterize, if a corresponding speech is to be generated for the commentary, the maximum number of characters included in unit time (for example, 1 second) of the generated speech.

The preset longest audio duration is used to characterize, if a corresponding speech is to be generated for the commentary, the longest playing duration of the generated speech. For example, if a corresponding short video is to be generated for the commentary, the preset longest audio duration may be 90 seconds.

The preset highest speech rate and the preset longest video duration may be predetermined by a technician. And of course, an interface for modifying the preset highest speech rate and the preset longest video duration may also be provided to modify the preset highest speech rate and the preset longest video duration.

With the preset highest speech rate and the preset longest audio duration, the product of the preset highest speech rate and the preset longest audio duration may be determined as the maximum number of characters of the commentary.

Second, performing digest extraction on the target text.

The digest may be extracted from the target text by various implementations, and the extracted digest text has characters fewer than the determined maximum number of characters of the commentary.

Finally, the extracted digest text is determined as the commentary of the target news cluster.

The extracted digest text having characters fewer than the maximum number of characters of the commentary may be determined as the commentary of the target news cluster.

The number of characters of the commentary determined according to the above implementation can meet the requirements of the preset highest speech rate and the preset longest audio duration.

It should be noted that the extraction of the digest from the text is the existing technology that has been widely studied and applied, and details are not described herein again.

With step 2022 implemented using the alternative implementation shown in FIG. 2C, the portion of text unsuitable for commentary can be reduced from the text included in the target news, and the portion of text suitable for commentary is then increased. In addition, the written language is replaced with the spoken language, so that the text included in the target news is more suitable for generating the commentary in accordance with human spoken habits.

Step 203: determining, based on the target video set and a target image set, a candidate material resource set corresponding to the commentary.

In the present embodiment, the executing body may determine, based on the target video set and the target image set, the candidate material resource set corresponding to the commentary by various implementations. The target image set is composed of respective images included in the target news cluster. It should be noted that candidate material resources in the determined candidate material resource set may be videos or images.

In some alternative implementations of the present embodiment, step 203 may be performed as follows: combining the target video set and the target image set to obtain the candidate material resource set corresponding to the commentary.

Figure 2D:
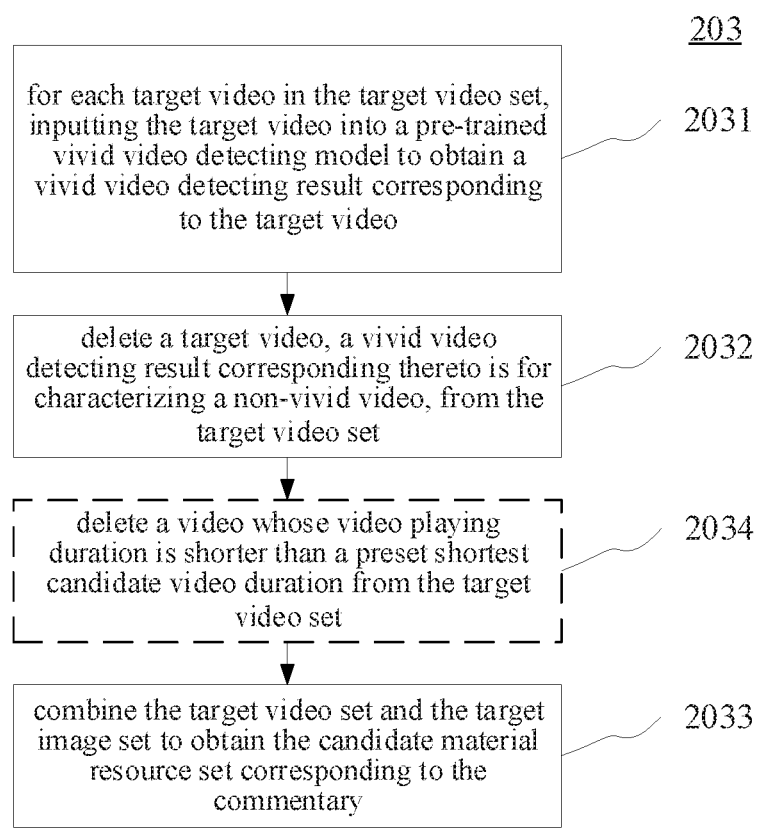
FIG. 2D is an exploded flowchart of step 203 according to an embodiment of the present disclosure.

In some alternative implementations of the present embodiment, step 203 may also include steps 2031 to 2033 as shown in FIG. 2D (not shown). Referring to FIG. 2D, an exploded flowchart of step 203 according to an embodiment of the present disclosure is shown.

Step 2031: for each target video in the target video set, inputting the target video into a pre-trained vivid video detecting model to obtain a vivid video detecting result corresponding to the target video.

It should be noted that the vivid video detecting model is used to characterize a corresponding relationship between a video and a vivid video detecting result for characterizing whether the video is a vivid video. The vivid video detecting model may be pre-trained by the following vivid video detecting model training steps.

First, a set of second training samples may be acquired.

The executing body of the vivid video detecting model training steps may be the same as or different from the executing body of the method for generating information. If same, the executing body of the vivid video detecting model training steps may store, after training the vivid video detecting model, the model structure information and model parameter values of the trained vivid video detecting model locally. If different, the executing body of the vivid video detecting model training steps may send, after training the vivid video detecting model, the model structure information and model parameter values of the trained vivid video detecting model to the executing body of the method for generating information.

The second training sample may include a historical news video and a labeling result for characterizing whether the historical video is a vivid video. In practice, whether the historical news video is a vivid video may be labeled manually.

The vivid video is a video that users are interested in and desire to watch, and the non-vivid video is a video that the users are not interested in and do not desire to watch.

For example, the video segment showing that the presenter sitting in the studio says: "Today is Friday, Feb. 1, 2019" may be labeled as a non-vivid video, while the video segment showing that the leader of a state gets off the plane and meets with the leader of another country may be labeled as a vivid video, etc.

Second, a model structure of an initial vivid video detecting model may be determined and model parameters of the initial vivid video detecting model may be initialized.

Since the vivid video detecting model may include various types of models, and for different types of models, the model structure information that needs to be determined is also different.

Alternatively, the initial vivid video detecting model may include a neural network, so it needs to be determined here which layers (e.g., convolutional layers, pooling layers, excitation function layers, etc.) the initial vivid video detecting model includes, in which order that the layers are connected, which parameters (e.g., a weight, a bias, and a step length of convolutions) each of the layers includes, etc.

Then, the model parameters of the initial vivid video detecting model may be initialized. In practice, the model parameters of the initial vivid video detecting model may be initialized with some different small random numbers. The "small random numbers" are used to ensure that the model would not enter saturation state due to oversize weights, which would cause training failure, and the "different" is used to ensure that the model can learn normally.

Then, the historical news videos and labeling results corresponding to the historical news videos in the second training sample of the set of second training samples may be respectively used as inputs and desired outputs of the initial vivid video detecting model, and the initial vivid video detecting model is trained using a machine learning method.

Specifically, a historical news video in a second training sample in the set of second training samples may be first input into the initial vivid video detecting model, to obtain an actual vivid video detecting result which indicates whether the historical news video is a vivid video. Then, the difference between the obtained actual vivid video detecting result and the labeling result in the second training sample may be calculated. Finally, the model parameters of the initial vivid video detecting model may be adjusted based on the calculated difference, and the training ends if a preset second training end condition is satisfied. For example, the preset second training end condition here may include at least one of the following: the training time exceeds a third preset time length, the number of trainings exceeds a second preset number, and the calculated difference is smaller than a second preset difference threshold.

The model parameters of the initial vivid video detecting model may be adjusted by various implementations based on the calculated difference between the actual vivid video detecting result and the labeling result in the training sample.

For example, stochastic gradient descent, a Newton's method, quasi-Newton methods, conjugate gradient, heuristic optimization, and other existing known or future developed various optimization algorithms may be used.

Finally, the trained initial vivid video detecting model may be determined as a pre-trained vivid video detecting model.

Step 2032: deleting a target video, a vivid video detecting result corresponding thereto is for characterizing a non-vivid video, from the target video set.

That is, non-vivid videos in the target video set are deleted, and vivid videos in the target video set are retained.

Step 2033: combining the target video set and the target image set to obtain the candidate material resource set corresponding to the commentary.

Among the videos in the candidate material resource set obtained by the implementation shown in FIG. 2D, the non-vivid videos are removed, while the vivid videos are retained. Since the number of material resources in the candidate material resource set is reduced, the number of calculations of the degree of matching between paragraphs in the subsequent calculated commentary and material resources in the candidate material resource set can be reduced, and then the consumption of computer resources (such as CPU resources, storage resources, and I/O resources) is reduced.

In some implementations, before step 2033, the executing body may perform step 2034 below.

Step 2034: deleting a video whose video playing duration is shorter than a preset shortest candidate video duration from the target video set.

For a video in the target video set whose playing duration is shorter than the preset shortest candidate video duration, the video reflects a little content, then the video may have no value, and the video needs to be deleted from the target video set to reduce the amount of material resources in the candidate material resource set, which in turn reduces the number of calculations of the degree of matching between paragraphs in the subsequent calculated commentary and material resources in the candidate material resource set, and also reduces the consumption of computing resources (such as CPU resources, storage resources, and I/O resources) of a computer.

In some alternative implementations of the present embodiment, step 203 may also be implemented as follows.

First, a video in the target video set whose video playing duration is shorter than the preset shortest candidate video duration is deleted.

The target video set and the target image set are combined to obtain the candidate material resource set corresponding to the commentary.

Step 204: for each paragraph in the commentary, determining degrees of matching between the paragraph and candidate material resources in the candidate material resource set.

In the present embodiment, the executing body may determine, for each paragraph in the commentary, the degrees of matching between the paragraph and candidate material resources in the candidate material resource set by various implementations.

Specifically, since the candidate material resources may be videos or images, the degrees of matching between a paragraph in the commentary and videos in the candidate material resource set may be calculated using various methods for calculating a degree of matching between a text and a video, and the degrees of matching between a paragraph in the commentary and images in the candidate material resource set may be calculated using various methods for calculating a degree of matching between a text and an image, which is not specifically limited herein.

Figure 2E:
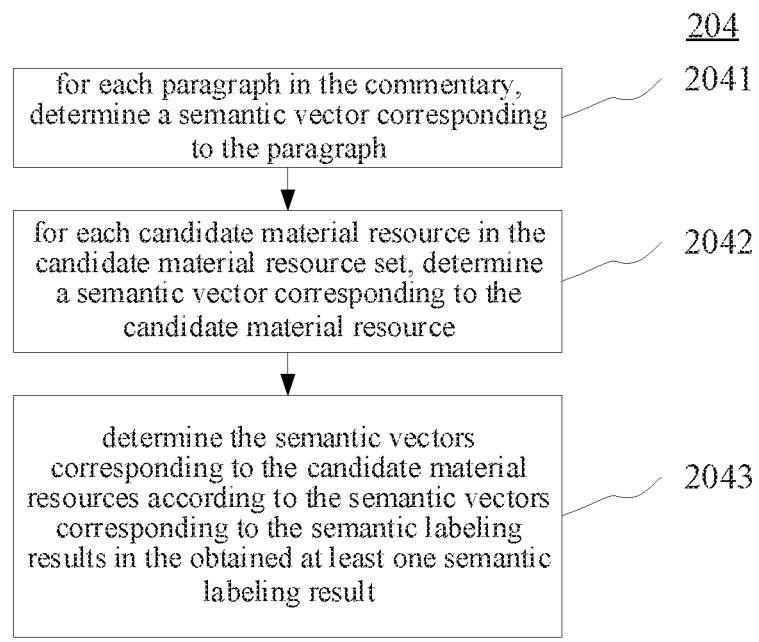
FIG. 2E is an exploded flowchart of step 204 according to an embodiment of the present disclosure.

In some alternative implementations of the present embodiment, step 204 may include steps 2041 to 2043 as shown in FIG. 2E. Referring to FIG. 2E, an exploded flowchart of step 204 according to an embodiment of the present disclosure is shown.

Step 2041: for each paragraph in the commentary, determining a semantic vector corresponding to the paragraph.

Here, the semantic vector corresponding to the paragraph may be determined by various implementations, that is, the paragraph is represented in a vector form to facilitate calculation.

For example, the semantic vector corresponding to a paragraph may be generated using a word bag model. Specifically, V is assumed to be the number of words included in a dictionary of the word bag model. For a paragraph P, the numbers of the $1^{st}$ word to the $V^{th}$ word in the dictionary included in the P are assumed to be $x_1$ to $x_v$, respectively. Then, the semantic vector corresponding to paragraph P is $\{x_1, x_2, \ldots, x_v\}$.

For another example, the paragraph may also be processed by word segmentation to obtain a word sequence corresponding to the paragraph. Then, for each word in the obtained word sequence, a word vector corresponding to the word is searched in a predetermined word vector table, and the semantic vector corresponding to the paragraph is determined according to the obtained word vectors corresponding to respective words in the word sequence. For example, a mean vector of the obtained word vectors corresponding to respective words in the word sequence may be determined as the semantic vector corresponding to the paragraph. For another example, a vector corresponding to medians of values at respective dimensions of the obtained word vectors corresponding to respective words in the word sequence may be determined as the semantic vector corresponding to the paragraph. The word vector table is used to characterize a corresponding relationship between a word and a word vector. The word vector table may be pre-trained. For example, the word vector table may be trained using a statistical-based method or a language model-based method.

For example, the statistical-based method may be a co-occurrence matrix method, which counts the number of co-occurrences of a word in a window of a predetermined size, and uses the number of co-occurrence words around a word as the word vector of the word. Specifically, a co-occurrence matrix may be constructed from a large number of corpus texts to define a word vector corresponding to a word among the words in the corpus texts, and then to obtain a word vector table.

For another example, the statistical-based method may also be a singular value decomposition method. Because of high dimension and sparsity of the co-occurrence matrix method, the singular value decomposition method refers to that singular value decomposition is performed on the matrix obtained by the co-occurrence matrix method to obtain an orthogonal matrix, the orthogonal matrix is normalized to obtain a matrix for defining a word vector corresponding to a word among the words occurring in the corpus texts, and then a word vector table is obtained.

The word vector table is generated based on a language model by training a Neural Network Language Model (NNLM), and the word vector table is an incidental output of the language model. The basic idea behind NNLM is to predict the words occurring in the context, and the prediction of the context is essentially a learning of co-occurrence statistical features. As an example, the method of generating word vectors using NNLM may include, but is not limited to, the following various methods: Skip-gram, CBOW, LBL, NNLM, C&W, GloVe, and the like.

Step 2042: for each candidate material resource in the candidate material resource set, determining a semantic vector corresponding to the candidate material resource.

Here, the semantic vector corresponding to the candidate material resource may be determined by various implementations.

Figure 2F:
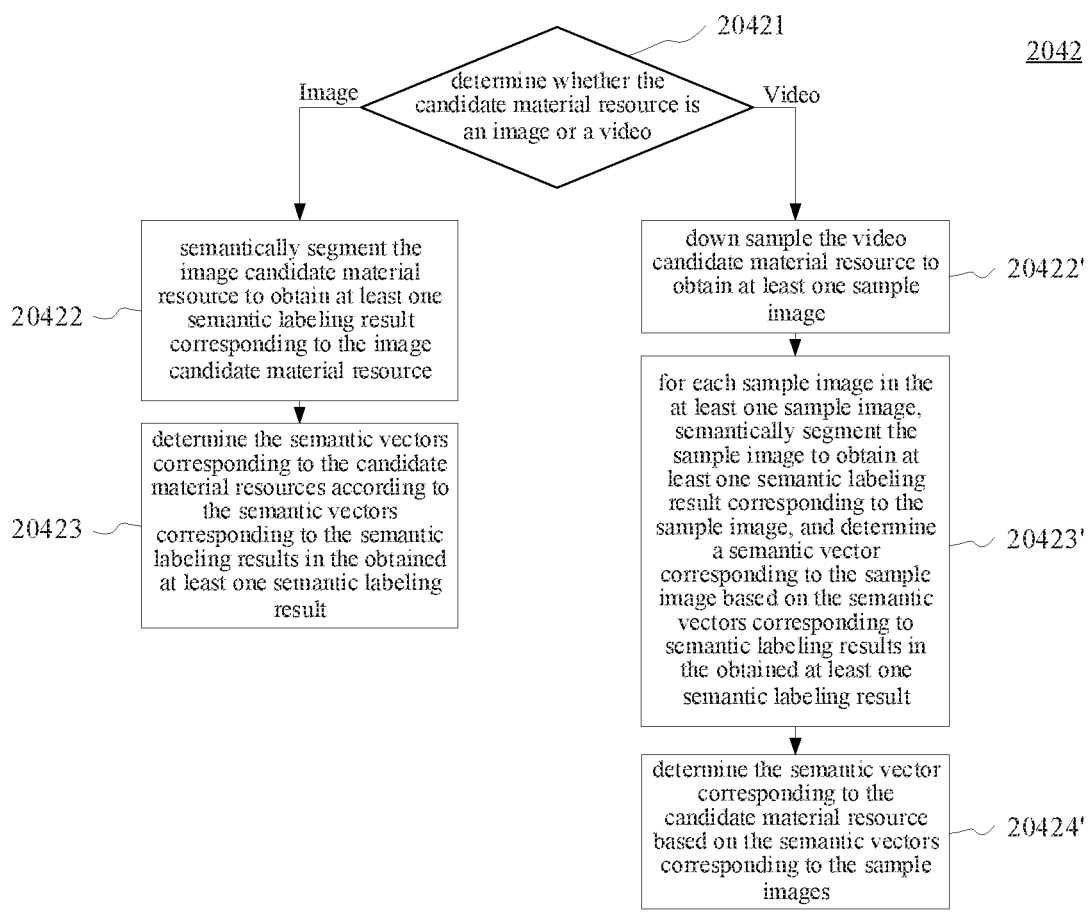
FIG. 2F is an exploded flowchart of step 2042 according to an embodiment of the present disclosure.

In some implementations, step 2042 may include step 20421 to step 20423 as shown in FIG. 2F. Referring to FIG. 2F, an exploded flowchart of step 2042 according to an embodiment of the present disclosure is shown.

Step 20421: determining whether the candidate material resource is an image or a video.

If it is determined that the candidate material resource is an image, go to step 20422.

If it is determined that the candidate material resource is a video, go to step 20422'.

Step 20422: semantically segmenting the image candidate material resource to obtain at least one semantic labeling result corresponding to the image candidate material resource.

When it is determined in step 20421 that the candidate material resource is an image, the image candidate material resource is semantically segmented by various implementations to obtain at least one semantic labeling result corresponding to the image candidate material resource, where a semantic labeling result may be a word or phrase. For example, if the image candidate material resource describes that a lion is chasing an antelope on a grassland, the at least one semantic labeling result obtained by semantically segmenting the image may be {"lion", "grassland", "antelope"}.

It should be noted that how to semantically segment the image is the existing technology that has been widely studied and applied, and details are not described herein again.

Step 20423: determining the semantic vectors corresponding to the candidate material resources according to the semantic vectors corresponding to the semantic labeling results in the obtained at least one semantic labeling result.

At least one semantic labeling result is obtained in step 20422. Here, the semantic vectors corresponding to semantic labeling results in the at least one semantic labeling result obtained in step 20422 may be first determined. Then, the semantic vector corresponding to the candidate material resource may be determined according to the semantic vectors corresponding to semantic labeling results in the at least one semantic labeling result by using, for example, a mean vector or a median vector.

The method for determining the word vectors corresponding to semantic labeling results may be referred to the related description in step 2041.

After step 20423, step 2042 is completed.

Step 20422': down sampling the video candidate material resource to obtain at least one sample image.

When it is determined in step 2041 that the candidate material resource is a video, the video candidate material resource is down sampled by various implementations to obtain at least one sample image. For example, a second preset number (e.g., 1) of frames of image may be sampled every first preset number (e.g., 10) of frames of image in the candidate material resource to obtain at least one sample image.

Step 20423': for each sample image in the at least one sample image, semantically segmenting the sample image to obtain at least one semantic labeling result corresponding to the sample image, and determining a semantic vector corresponding to the sample image based on the semantic vectors corresponding to semantic labeling results in the obtained at least one semantic labeling result.

Each sample image is semantically segmented in step 20423', and for each sample image, the specific operation of determining the semantic vector corresponding to the sample image based on the semantic vectors corresponding to semantic labeling results in the obtained at least one semantic labeling result is substantially the same as the corresponding specific operation described in step 20423, so details are not described herein again.

Step 2024': determining the semantic vector corresponding to the candidate material resource based on the semantic vectors corresponding to the sample images.

Since the semantic vectors corresponding to the sample images are obtained in step 20423', the semantic vector corresponding to the candidate material resource can be determined according to the semantic vectors corresponding to sample images obtained in step 20423'. For example, a mean vector of the semantic vectors corresponding to the respective sample images may be determined as the semantic vector corresponding to the candidate material resource. For another example, a vector corresponding to medians of values at respective dimensions of the semantic vectors corresponding to the respective sample images may also be determined as the semantic vector corresponding to the candidate material resource.

After step 20424', step 2042 is completed.

Step 2043: determining a similarity between a semantic vector corresponding to a paragraph in the commentary and a semantic vector corresponding to a candidate material resource in the candidate material resource set as the degree of matching between the paragraph and the candidate material resource.

The similarity between a semantic vector corresponding to a paragraph in the commentary and a semantic vector corresponding to a candidate material resource in the candidate material resource set may be calculated using various methods for calculating a similarity between vectors. For example, the similarity between the vectors may be determined by calculating a Euclidean distance, a Manhattan distance, Chebyshev distance, a Minkowski distance, a standardized Euclidean distance, a Mahalanobis distance, a cosine similarity, a Hamming distance, a Jaccard distance, a Jaccard similarity coefficient, a correlation coefficient, a correlation distance, an information entropy or the like between the vectors.

Figure 3:
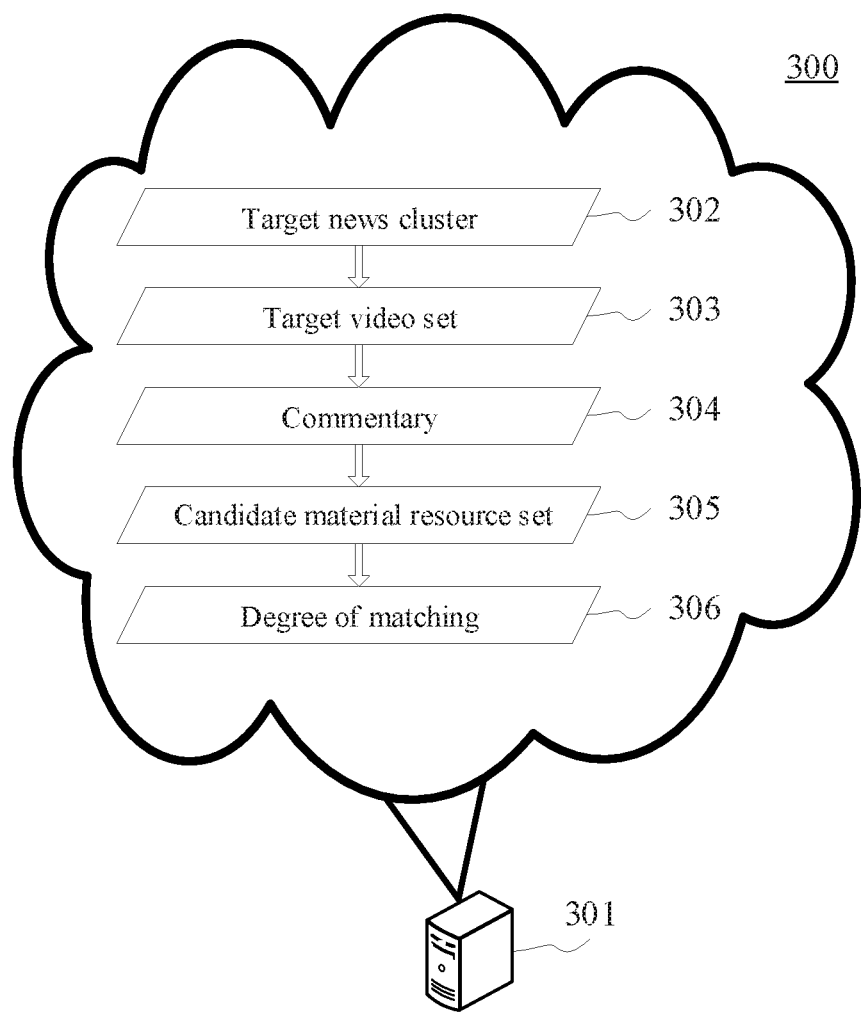
FIG. 3 is a schematic diagram of an application scenario of the method for generating information according to some embodiments of the present disclosure.

Further, referring to FIG. 3, which is a schematic diagram of an application scenario of the method for generating information according to the present embodiment. In the application scenario of FIG. 3, a server 301 supporting a news website may determine at least one video segment obtained by semantically segmenting the respective videos included in a target news cluster 302 as a target video set 303; then, the server 301 may determine a commentary 304 of the target news cluster; next, the server 301 may determine, based on the target video set and a target image set, a candidate material resource set 305 corresponding to the commentary; and finally, the server 301 may determine, for each paragraph in the commentary, degrees of matching 306 between the paragraph and candidate material resources in the candidate material resource set.

Generally, a commentary is generated only for a cluster of multiple news for a given news event, users need to read the commentary in text form to get news digests so as to quickly understand the content of the news event, and corresponding commentary videos are not generated for the news cluster. According to the above method for generating information provided by the above embodiments of the present disclosure, based on at least one video segment obtained by semantically segmenting a video included in a target news cluster and an image included in the target news cluster, a candidate material resource set corresponding to a commentary of the target news cluster is determined, and degrees of matching between paragraphs in the commentary and candidate material resources in the candidate material resource set are determined, thereby providing a data source for subsequently generating a corresponding video for the commentary by using the candidate material resources, and then improving the degree of fit between the subsequently generated video corresponding to the commentary and the commentary. Moreover, in the prior art, during determining a candidate material resource corresponding to a text, the degree of matching between the material resource (for example, video or image) and the text is directly calculated, but in the method for generating information according to the above embodiments of the present disclosure, each video included in a target news cluster is first semantically segmented to obtain a target video set, then each video included in the target video set has separate semantics, so that when the degrees of matching between videos in the target video set and paragraphs of the commentary is calculated, the accuracy of the calculated degree of matching can be improved, and the subsequently generated degree of fit between the video corresponding to the commentary and the commentary on a finer granularity can be further improved.

Figure 4A:
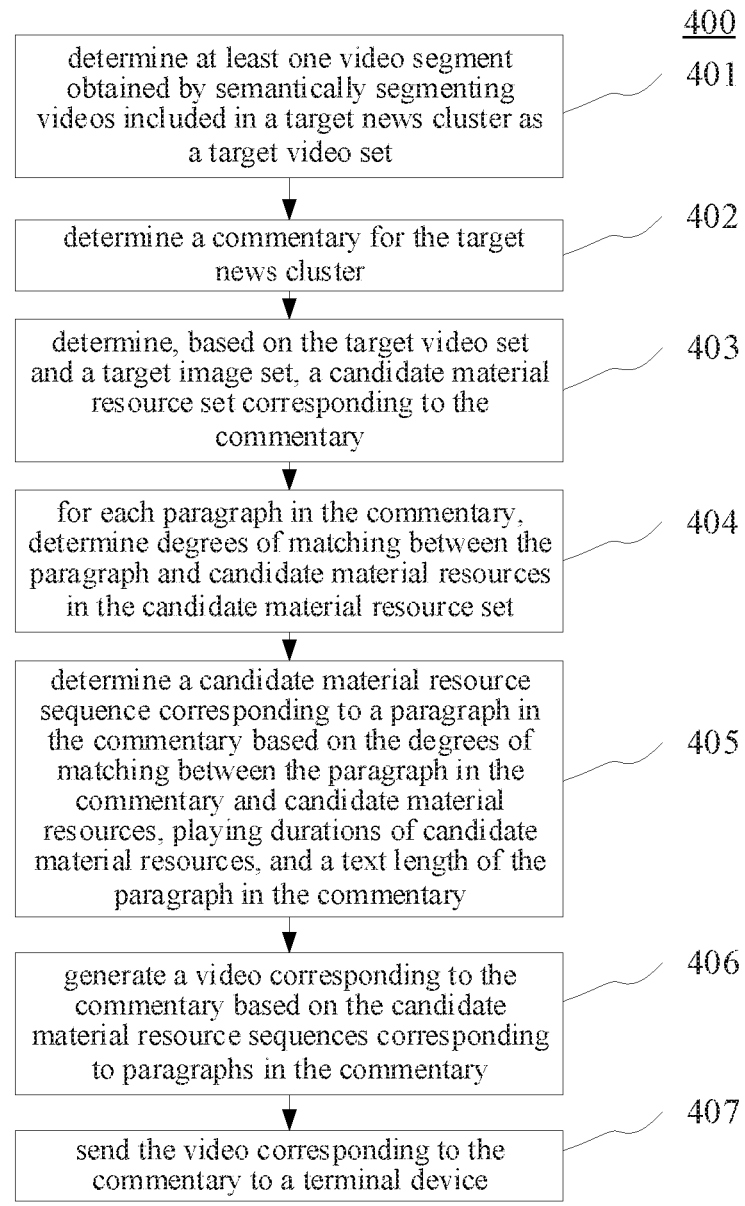
FIG. 4A is a flowchart of the method for generating information according to another embodiment of the present disclosure.

Further referring to FIG. 4A, a flow 400 of another embodiment of the method for generating information is shown. The flow 400 of the method for generating information includes the following steps.

Step 401: determining at least one video segment obtained by semantically segmenting videos included in a target news cluster as a target video set.

Step 402: determining a commentary for the target news cluster.

Step 403: determining, based on the target video set and a target image set, a candidate material resource set corresponding to the commentary.

Step 404: for each paragraph in the commentary, determining degrees of matching between the paragraph and candidate material resources in the candidate material resource set.

In the present embodiment, the specific operations of step 401, step 402, step 403, and step 404 are substantially the same as the operations of step 201, step 202, step 203, and step 204 in the embodiment shown in FIG. 2, and details are not described herein again.

Step 405: determining a candidate material resource sequence corresponding to a paragraph in the commentary based on the degrees of matching between the paragraph in the commentary and candidate material resources, playing durations of candidate material resources, and a text length of the paragraph in the commentary.

In the present embodiment, the executing body (for example, the server 105 shown in FIG. 1) of the method for generating information may determine, after determining the degrees of matching between a paragraph in the commentary and candidate material resources in the candidate material resource set in step 404, the candidate material resource sequence corresponding to the paragraph in the commentary based on the degrees of matching between the paragraph in the commentary and candidate material resources, the playing durations of candidate material resources, and the text length of the paragraph in the commentary. It should be noted here that the playing duration of a candidate material resource of a video type is its inherent attribute and is constant. In practice, the playing duration of each candidate material resource of an image type may be set to a constant preset playing duration (for example, 3 seconds). Thus, all the candidate material resources may have a constant playing duration attribute.

In some alternative implementations of the present embodiment, step 405 may be implemented as follows.

For each paragraph in the commentary, the candidate material resource sequence corresponding to the paragraph is determined using a first preset optimization algorithm, with the playing duration of the candidate material resource sequence corresponding to the paragraph being equal to the corresponding playing duration of the paragraph as the constraint condition, and with a degree of matching between the candidate material resource sequence corresponding to the paragraph and the paragraph is maximum as the optimization objective.

That is, for each paragraph in the commentary, candidate material resources sequentially arranged are selected from the candidate material resource set determined in step 403, to constitute the candidate material resource sequence corresponding to the paragraph, and the playing duration of the selected candidate material resource sequence corresponding to the paragraph is equal to the corresponding playing duration of the paragraph.

Here, the playing duration of the candidate material resource sequence is the sum of the playing durations of the candidate material resources in the candidate material resource sequence. The corresponding playing duration of the paragraph is determined by the number of words in the paragraph and a default speech rate. For example, if the default speech rate is N words per second and the number of words in the paragraph is M words, the corresponding playing duration of the paragraph is L seconds, where L is the ratio obtained by dividing M by N.

The first preset optimization algorithm may be various optimization algorithms that can solve the constraint condition and the optimization goal. For example, the first preset optimization algorithm may include, but is not limited to, a dynamic programming algorithm and a shortest path optimization algorithm.

In some alternative implementations of the present embodiment, step 405 may also be implemented as follows.

The candidate material resource sequences corresponding to paragraphs in the commentary are determined using a second preset optimization algorithm, with the playing duration of the candidate material resource sequences corresponding to paragraphs in the commentary is equal to the corresponding playing duration of the paragraphs as the constraint condition, with a sum of degrees of matching between the candidate material resource sequences corresponding to respective paragraphs in the commentary and the corresponding paragraphs is maximum as the optimization objective.

Compared with the above alternative implementation, the optimization objective here is different from the optimization objective of the above alternative implementation. In the above alternative implementation, optimization is performed on each paragraph, and with that the degrees of matching between each paragraph and the candidate material resource sequence corresponding to the each paragraph is maximum as the optimization objective. In the alternative implementation here, the paragraphs in the commentary are optimized as a whole, and with that the sum of the degrees of matching between the candidate material resource sequences corresponding to respective paragraphs in the commentary and the corresponding paragraphs is maximum the optimization goal.

The second preset optimization algorithm may also be various optimization algorithms that can solve the constraint condition and the optimization goal. For example, the second preset optimization algorithm may include, but is not limited to, a dynamic programming algorithm and a shortest path optimization algorithm.

In some alternative implementations of the present embodiment, the candidate material resources in the candidate material resource sequences corresponding to paragraphs in the commentary determined in step 405 may be different from each other. In this way, repeated images or videos do not occur in the corresponding video subsequently generated for the commentary, and the readability and vividness of the generated video can be increased. It can be appreciated that if the candidate material resources in the candidate material resources sequence corresponding to paragraphs in the commentary determined in step 405 are different from each other, the constraint condition that the candidate material resources in the determined candidate material resource sequences corresponding to paragraphs in the commentary are different from each other needs to be added to the constraint conditions in the above two alternative implementations.

Step 406: generating a video corresponding to the commentary based on the candidate material resource sequences corresponding to paragraphs in the commentary.

In the present embodiment, the executing body may generate the video corresponding to the commentary based on the candidate material resource sequences corresponding to the paragraphs in the commentary determined in step 405.

Figure 4B:
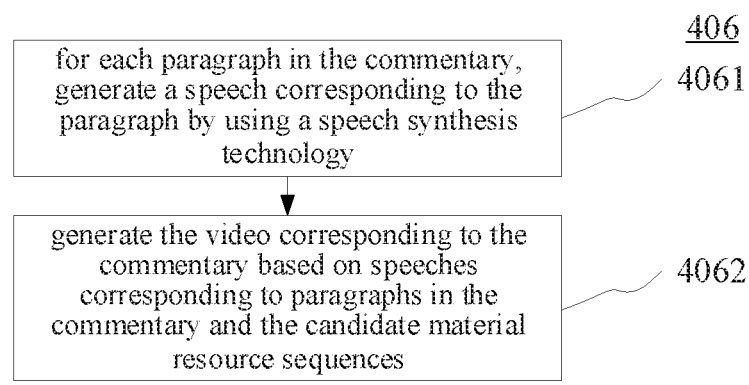
FIG. 4B is an exploded flowchart of step 406 according to an embodiment of the present disclosure.

In some alternative implementations of the present embodiment, step 406 may include step 4061 and step 4062 shown in FIG. 4B. Referring to FIG. 4B, an exploded flowchart of step 406 according to an embodiment of the present disclosure is shown.

Step 4061: for each paragraph in the commentary, generating a speech corresponding to the paragraph by using a speech synthesis technology.

It should be noted that the speech synthesis technology is the existing technology that has been widely studied and applied, and details are not described herein again.

Step 4062: generating the video corresponding to the commentary based on speeches corresponding to paragraphs in the commentary and the candidate material resource sequences.

In some implementations, step 4062 may be performed as follows:

First, the speeches corresponding to respective paragraphs may be connected in the order from front to back paragraphs in the commentary to obtain a first audio.

Second, the videos corresponding to respective paragraphs can be connected in the order from front to back paragraphs in the commentary to obtain a first video.

Here, a video corresponding to a paragraph is obtained by sequentially connecting the candidate material resources in the candidate material resource sequence corresponding to the paragraph.

Finally, the obtained first audio and first video are respectively determined as an audio portion and a video portion of the video corresponding to the commentary.

Figure 4C:
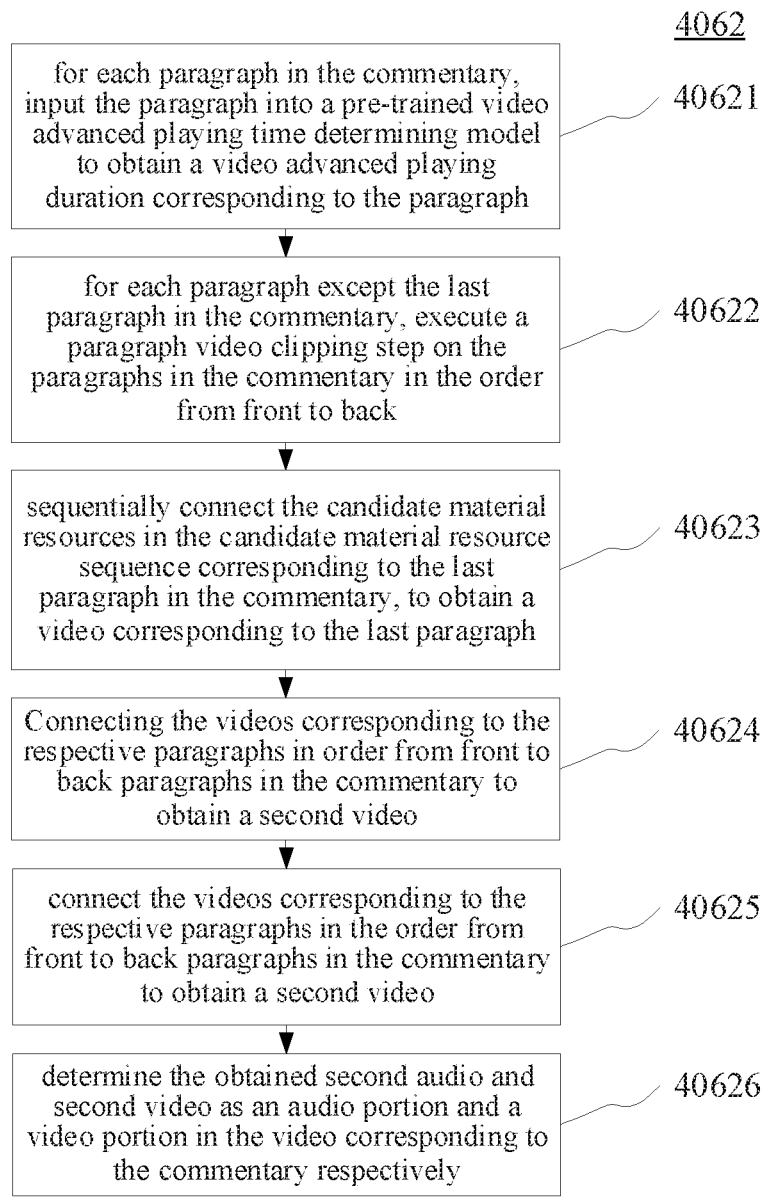
FIG. 4C is an exploded flowchart of step 4062 according to an embodiment of the present disclosure.

In some implementations, step 4062 may also include step 40621 to step 40626 as shown in FIG. 4C. Referring to FIG. 4C, an exploded flowchart of step 4062 according to an embodiment of the present disclosure is shown.

Step 40621: for each paragraph in the commentary, inputting the paragraph into a pre-trained video advanced playing time determining model to obtain a video advanced playing duration corresponding to the paragraph.

Here, the video advanced playing time determining model is used to characterize a corresponding relationship between a text and a video advanced playing duration corresponding to the text.

In practice, a news video manually clipped is usually played for a short period of time before the presenter speaks. In order to make the video generated for the commentary more in line with the human watching habit and more like the news video manually clipped, the video advanced playing time determining model may be pre-trained based on a large number of third training samples, where the third training sample may include a text included in a sample news video and a labeled duration which indicates the duration of the video in the sample news video prior to the commentary speech. The step of training the video advanced playing time determining model may be substantially the same as the step of training the score calculation model or the step of training the vivid video detecting model, and details are not described herein again.

Step 40622: for each paragraph except the last paragraph in the commentary, executing a paragraph video clipping step on the paragraphs in the commentary in the order from front to back.

Here, the paragraph video clipping step may include the following operations.

First, the video advanced playing duration corresponding to the next paragraph of the paragraph is determined as a video clipping duration.

Second, the candidate material resources in the candidate material resource sequence corresponding to the paragraph are sequentially connected to obtain a video corresponding to the paragraph.

Third, the video of the video clipping duration is clipped from the tail of the video corresponding to the paragraph.

That is, in the solution, for each paragraph except the first paragraph in the commentary, the video corresponding to the paragraph is played in advance, and covers the tail of the video of the previous paragraph of the paragraph, where the duration of advanced playing and coverage of the video is the video advanced playing duration corresponding to the paragraph determined in step 40621.

Step 40623: sequentially connecting the candidate material resources in the candidate material resource sequence corresponding to the last paragraph in the commentary, to obtain a video corresponding to the last paragraph.

Step 40624: connecting the videos corresponding to the respective paragraphs in the order from front to back paragraphs in the commentary to obtain a second video.

Step 40625: connecting the speeches corresponding to the respective paragraphs in the order from front to back paragraphs in the commentary to obtain a second audio.

Step 40626: determining the obtained second audio and second video as an audio portion and a video portion in the video corresponding to the commentary respectively.

Figure 4D:
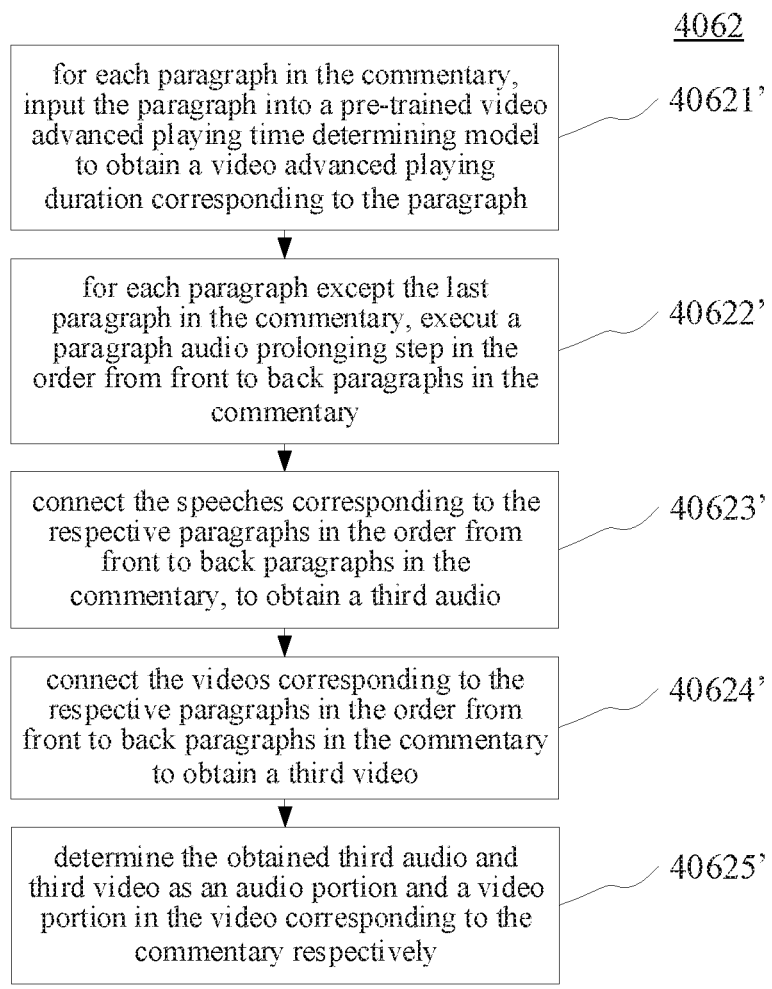
FIG. 4D is an exploded flowchart of step 4062 according to another embodiment of the present disclosure.

In some implementations, step 4062 may also include step 40621' to step 40625' as shown in FIG. 4D. Referring to FIG.

4D, an exploded flowchart of step 4062 according to another embodiment the present disclosure is shown.

Step 40621': for each paragraph in the commentary, inputting the paragraph into a pre-trained video advanced playing time determining model to obtain a video advanced playing duration corresponding to the paragraph.

The specific operation of step 40621' is substantially the same as the operation of step 40621, and details are not described herein again.

Step 40622': for each paragraph except the last paragraph in the commentary, executing a paragraph audio prolonging step in the order from front to back paragraphs in the commentary.

Here, the paragraph audio prolonging step may include the following operations.

First, the video advanced playing duration corresponding to a next paragraph of the paragraph is determined as an audio prolonging duration.

Second, a silent playing duration of the determined audio prolonging duration is added to the tail of the speech corresponding to the paragraph.

That is, in the solution, for each paragraph except the first paragraph in the commentary, the video corresponding to the paragraph is played in advance, and the silent playing duration is added to the tail of the audio of the previous paragraph of the paragraph, where the duration of playing the video in advance and prolonging the audio is the video advanced playing duration corresponding to the paragraph determined in step 40621'.

Step 40623': connecting the speeches corresponding to the respective paragraphs in the order from front to back paragraphs in the commentary, to obtain a third audio.

Step 40624': connecting the videos corresponding to the respective paragraphs in the order from front to back paragraphs in the commentary to obtain a third video.

Here, the videos corresponding to the paragraphs are videos obtained by sequentially connecting the candidate material resources in the candidate material resource sequence corresponding to the paragraphs.

Step 40625': determining the obtained third audio and third video as an audio portion and a video portion in the video corresponding to the commentary respectively.

Step 407: sending the video corresponding to the commentary to a terminal device.

In the present embodiment, the executing body may send the video corresponding to the commentary generated in step 406 to the terminal device. Here, the terminal device may be an electronic device connected to the executing body via a network. In this way, the terminal device may present the received video in response to receiving the video sent by the executing body, and the video corresponding to the commentary of the target news cluster is presented on the terminal device accordingly. The user can quickly learn the news event being directed to by target news cluster by watching the presented video corresponding to the commentary of the target news cluster on the terminal device, without reading the text, thereby improving the efficiency of the user to get the news event.

It can be seen from FIG. 4A that, compared with the embodiments corresponding to FIG. 2A, the flow 400 of the method for generating information in the present embodiment increases the steps of determining candidate material resource sequences corresponding to paragraphs in the commentary, generating a video corresponding to the commentary based on the candidate material resource sequences corresponding to the paragraphs in the commentary, and sending the video corresponding to the commentary to the terminal device. Thus, the solution described in the present embodiment can present the received video corresponding to the target news cluster at the terminal device. The user can quickly learn the news event to which is the target news cluster directed by watching the presented video corresponding to the commentary of the target news cluster on the terminal device, without reading the text, thereby improving the efficiency of the user to get the news event through the terminal device, that is, extending the function of the terminal device to present information.

Figure 5:
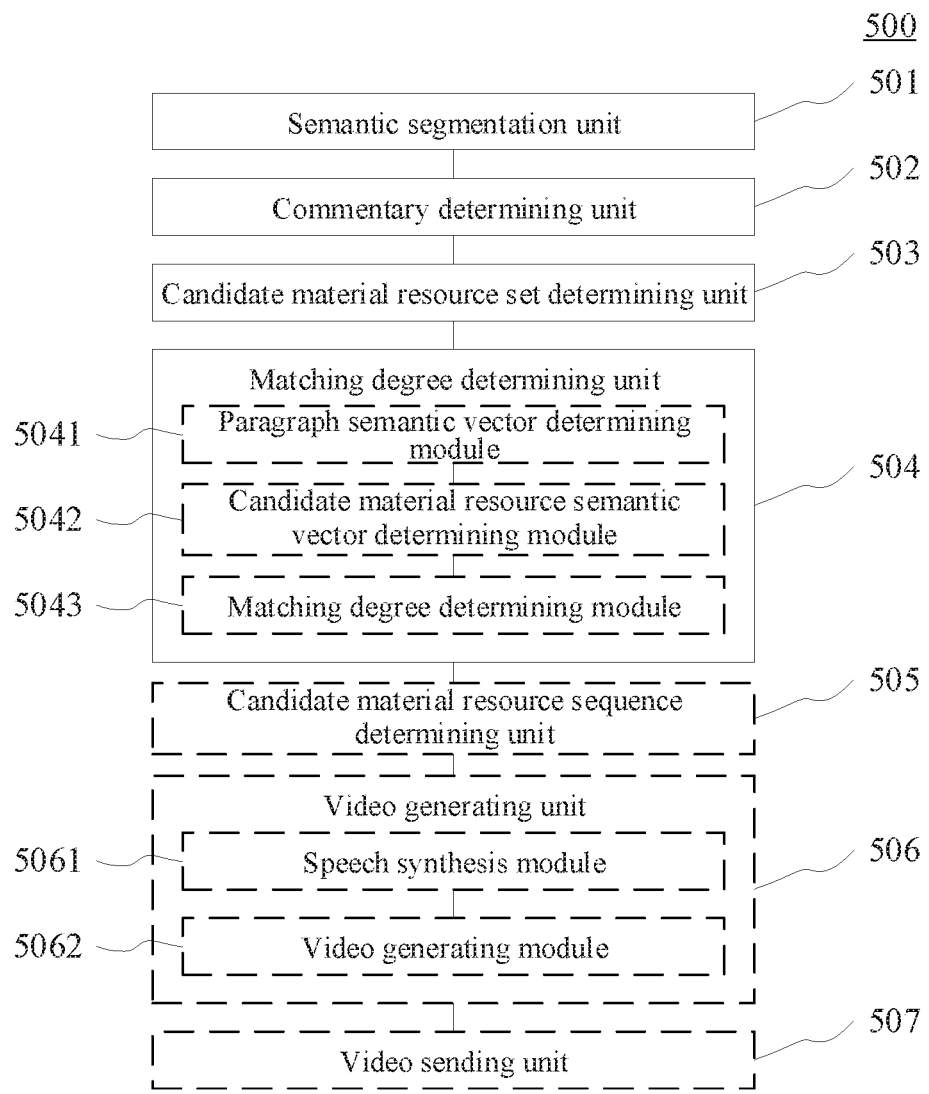
FIG. 5 is a schematic structural diagram of an apparatus for generating information according to an embodiment of the present disclosure.

Further referring to FIG. 5, as an implementation of the method shown in the above figures, some embodiments of the present disclosure provide an apparatus for generating information. The embodiment of the apparatus corresponds to the embodiment of the method shown in FIG. 2, and the apparatus may be applied to various electronic devices.

As shown in FIG. 5, the apparatus 500 for generating information in the present embodiment includes: a semantic segmentation unit 501, a commentary determining unit 502, a candidate material resource set determining unit 503, and a matching degree determining unit 504. The semantic segmentation unit 501 is configured to determine at least one video segment obtained by semantically segmenting videos included in a target news cluster as a target video set, where respective pieces of news in the target news cluster directs to a given news event; the commentary determining unit 502 is configured to determine a commentary for the target news cluster; the candidate material resource set determining unit 503 is configured to determine, based on the target video set and a target image set, a candidate material resource set corresponding to the commentary, where the target image set is composed of respective images included in the target news cluster; and the matching degree determining unit 504 is configured to determine, for each paragraph in the commentary, degrees of matching between the paragraph and each candidate material resources in the candidate material resource set.

In the present embodiment, the specific processing of the semantic segmentation unit 501, the commentary determining unit 502, the candidate material resource set determining unit 503, and the matching degree determining unit 504 of the apparatus 500 for generating information and the technical effects thereof may be referred to the related description in step 201, step 202, step 203, and step 204 in the corresponding embodiment of FIG. 2A, respectively. The description will not be repeated here.

In some alternative implementations of the present embodiment, the apparatus 500 may further include: a candidate material resource sequence determining unit 505, configured to determine a candidate material resource sequence corresponding to the paragraph in the commentary based on the degrees of matching between the paragraph in the commentary and the candidate material resources, playing durations of the candidate material resources, and a text length of the paragraph in the commentary; and a video generating unit 506, configured to generate a video corresponding to the commentary based on the candidate material resource sequences corresponding to paragraphs in the commentary.

In some alternative implementations of the present embodiment, the apparatus 500 may further include: a video sending unit 507, configured to send the video corresponding to the commentary to a terminal device, so that the terminal device presents the received video.

In some alternative implementations of the present embodiment, the video generating unit 506 may include: a speech synthesis module 5061, configured to generate, for each paragraph in the commentary, a speech corresponding to the paragraph by using a speech synthesis technology; and a video generating module 5062, configured to generate the video corresponding to the commentary based on speeches corresponding to the paragraphs in the commentary and the candidate material resource sequences.

In some alternative implementations of the present embodiment, the candidate material resource set determining unit 503 may be further configured to: combine the target video set and the target image set to obtain the candidate material resource set corresponding to the commentary.

In some alternative implementations of the present embodiment, the candidate material resource set determining unit 503 may be further configured to: input, for each target video in the target video set, the target video into a pre-trained vivid video detecting model to obtain a vivid video detecting result corresponding to the target video, where the vivid video detecting model is used to characterize a corresponding relationship between a video and a vivid video detecting result for characterizing whether the video is a vivid video; delete a target video corresponding to a vivid video detecting result for characterizing a non-vivid video from the target video set; and combine the target video set and the target image set to obtain the candidate material resource set corresponding to the commentary.

In some alternative implementations of the present embodiment, the candidate material resource set determining unit may be further configured to: delete a video with a playing duration shorter than a preset shortest candidate video duration from the target video set, after deleting a target video corresponding to a vivid video detecting results for characterizing a non-vivid video from the target video set.

In some alternative implementations of the present embodiment, the matching degree determining unit 504 may include: a paragraph semantic vector determining module 5041, configured to determine, for each paragraph in the commentary, a semantic vector corresponding to the paragraph; a candidate material resource semantic vector determining module 5042, configured to determine, for each candidate material resource in the candidate material resource set, a semantic vector corresponding to the candidate material resource; and a matching degree determining module 5043, configured to determine a similarity between a semantic vector corresponding to a paragraph in the commentary and a semantic vector corresponding to a candidate material resource in the candidate material resource set as a degree of matching between the paragraph and the candidate material resource.

In some alternative implementations of the present embodiment, the candidate material resource semantic vector determining module 5042 may be further configured to: semantically segment, in response to determining that the candidate material resource is an image, the image candidate material resource to obtain at least one semantic labeling result corresponding to the image candidate material resource, and determine the semantic vector corresponding to the candidate material resource based on semantic vectors corresponding to each semantic labeling result among the obtained at least one semantic labeling result; down sample, in response to determining that the candidate material resource is a video, the video candidate material resource to obtain at least one sample image; for each sample image in the at least one sample image, semantically segment the sample image to obtain at least one semantic labeling result corresponding to the sample image, and determine a semantic vector corresponding to the sample image based on semantic vectors corresponding to semantic labeling results among the obtained at least one semantic labeling result; and determine the semantic vector corresponding to the candidate material resource based on the semantic vectors corresponding to sample images.

In some alternative implementations of the present embodiment, determining the semantic vector corresponding to the candidate material resource based on the semantic vectors corresponding to sample images may include: determining a mean vector of the semantic vectors corresponding to the respective sample images as the semantic vector corresponding to the candidate material resource.

In some alternative implementations of the present embodiment, determining the semantic vector corresponding to the candidate material resource based on the semantic vectors corresponding to sample images may include: determining a vector corresponding to medians of values at respective dimensions of the semantic vectors corresponding to the respective sample images as the semantic vector corresponding to the candidate material resource.

It should be noted that the implementation details of the units in the apparatus for generating information according to some embodiments of the present disclosure and the technical effects thereof may be referred to the descriptions of other embodiments in the present disclosure, and details are not described herein again.

Figure 6:
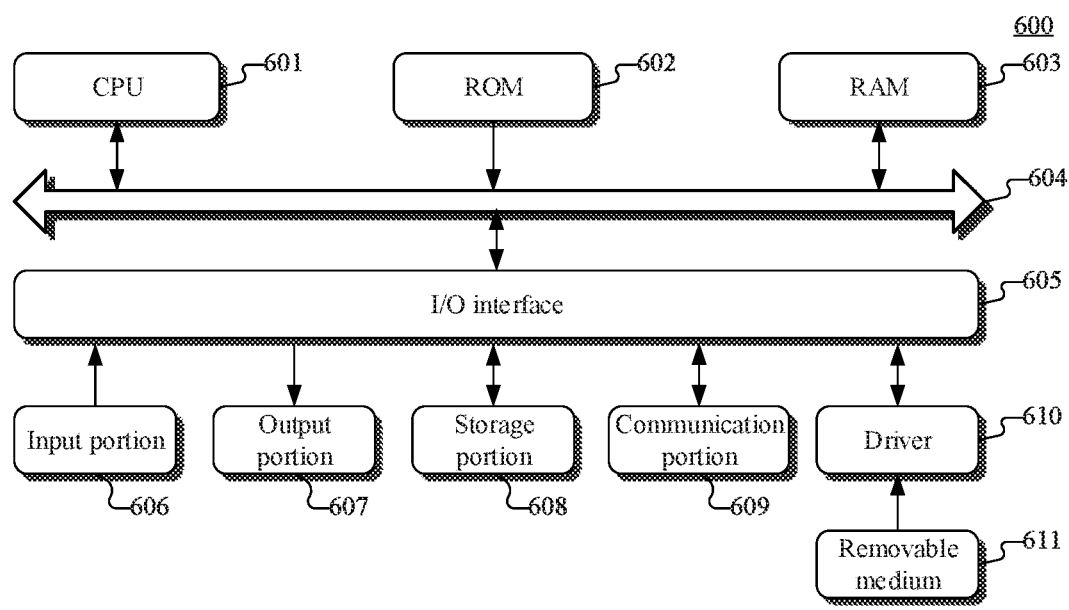
FIG. 6 is a schematic structural diagram of a computer system adapted to implement a server of embodiments of the present disclosure.

Referring to FIG. 6, a schematic structural diagram of a computer system 600 adapted to implement a server of the embodiments of the present disclosure is shown. The server shown in FIG. 6 is merely an example, and should not limit the function and scope of use of the embodiments of the present disclosure.

As shown in FIG. 6, the computer system 600 includes one or more Central Processing Units (CPUs) 601, which can execute various appropriate operations and processes based on programs stored in a Read Only Memory (ROM) 602 or programs loaded from a storage portion 608 to a Random Access Memory (RAM) 603. The RAM 603 also stores various programs and data required by operations of the system 600. The CPU 601, the ROM 602, and the RAM 603 are connected to each other through a bus 604. An Input/Output (I/O) interface 605 is also connected to the bus 604.

The following components are connected to the I/O interface 605: an input portion 606 including a keyboard, a mouse, or the like; an output portion 607 including a Cathode Ray Tube (CRT), a Liquid Crystal Display (LCD), a speaker, or the like; a storage portion 608 including a hard disk or the like; and a communication portion 609 including a network interface card, such as a Local Area Network (LAN) card and a modem. The communication portion 609 performs communication processes via a network, such as the Internet. A driver 610 is also connected to the I/O interface 605 as required. A removable medium 611 such as a magnetic disk, an optical disk, a magneto-optical disk or a semiconductor memory is installed on the driver 610 as needed, so that a computer program read therefrom is installed in the storage portion 608 as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, or may be installed from the removeable medium 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising: a semantic segmentation unit, a commentary determining unit, a candidate material resource set determining unit, and a matching degree determining unit. The names of these units do not in some cases constitute a limitation to such units themselves. For example, the semantic segmentation unit may also be described as "a unit configured to determine at least one video segment obtained by semantically segmenting each video included in a target news cluster as a target video set".

In another aspect, some embodiments of the present disclosure further provide a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: determine at least one video segment obtained by semantically segmenting videos included in a target news cluster as a target video set, where respective pieces of news in the target news cluster is directs to a given news event; determine a commentary for the target news cluster; determine, based on the target video set and a target image set, a candidate material resource set corresponding to the commentary, where the target image set is composed of respective images included in the target news cluster; and for each paragraph in the commentary, determining degrees of matching between the paragraph and candidate material resources in the candidate material resource set.

In still another aspect, some embodiments of the present disclosure further provides another server, including: an interface; a memory, storing one or more programs; and one or more processors operatively connected to the interface and the memory, and configured to: determine at least one video segment obtained by semantically segmenting videos included in a target news cluster as a target video set, where respective pieces of news in the target news cluster is directs to a given news event; determine a commentary for the target news cluster; determine, based on the target video set and a target image set, a candidate material resource set corresponding to the commentary, where the target image set is composed of respective images included in the target news cluster; and for each paragraph in the commentary, determining degrees of matching between the paragraph and candidate material resources in the candidate material resource set.

In still another aspect, an embodiment of the present disclosure provides a computer-readable storage medium, storing a computer program, where the computer program, when executed by one or more processors, causes the one or more processors to: determine at least one video segment obtained by semantically segmenting videos included in a target news cluster as a target video set, where respective pieces of news in the target news cluster is directs to a given news event; determine a commentary for the target news cluster; determine, based on the target video set and a target image set, a candidate material resource set corresponding to the commentary, where the target image set is composed of respective images included in the target news cluster; and for each paragraph in the commentary, determining degrees of matching between the paragraph and candidate material resources in the candidate material resource set.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating information, comprising:
   determining at least one video segment obtained by semantically segmenting videos comprised in a target news cluster as a target video set, wherein respective pieces of news in the target news cluster direct to a given news event;
   determining a commentary for the target news cluster;
   determining, based on the target video set and a target image set, a candidate material resource set corresponding to the commentary, wherein the target image set is composed of respective images comprised in the target news cluster; and
   for each paragraph in the commentary, determining degrees of matching between the paragraph and candidate material resources in the candidate material resource set.

2. The method according to claim 1, wherein the method further comprises:
   determining a candidate material resource sequence corresponding to the paragraph in the commentary based on the degrees of matching between the paragraph in the commentary and the candidate material resources, playing durations of the candidate material resources, and a text length of the paragraph in the commentary; and
   generating a video corresponding to the commentary based on the candidate material resource sequences corresponding to paragraphs in the commentary.

3. The method according to claim 2, wherein the method further comprises:
   sending the video corresponding to the commentary to a terminal device, so that the terminal device presents the received video.

4. The method according to claim 3, wherein the generating a video corresponding to the commentary based on the candidate material resource sequences corresponding to paragraphs in the commentary comprises:
   for each paragraph in the commentary, generating a speech corresponding to the paragraph by using a speech synthesis technology; and
   generating the video corresponding to the commentary based on speeches corresponding to the paragraphs in the commentary and the candidate material resource sequences.

5. The method according to claim 4, wherein the determining, based on the target video set and a target image set, a candidate material resource set corresponding to the commentary comprises:
   combining the target video set and the target image set to obtain the candidate material resource set corresponding to the commentary.

6. The method according to claim 4, wherein the determining, based on the target video set and a target image set, a candidate material resource set corresponding to the commentary comprises:
   for each target video in the target video set, inputting the target video into a pre-trained vivid video detecting model to obtain a vivid video detecting result corresponding to the target video, wherein the vivid video detecting model is used to characterize a corresponding relationship between a video and a vivid video detecting result for characterizing whether the video is a vivid video;
   deleting a target video corresponding to a vivid video detecting result for characterizing a non-vivid video from the target video set; and
   combining the target video set and the target image set to obtain the candidate material resource set corresponding to the commentary.

7. The method according to claim 6, wherein after deleting a target video corresponding to a vivid video detecting results for characterizing a non-vivid video from the target video set, the method further comprises:
   deleting a video with a playing duration shorter than a preset shortest candidate video duration from the target video set.

8. The method according to claim 4, wherein the determining, for each paragraph in the commentary, degrees of matching between the paragraph and candidate material resources in the candidate material resource set comprises:
   for each paragraph in the commentary, determining a semantic vector corresponding to the paragraph;
   for each candidate material resource in the candidate material resource set, determining a semantic vector corresponding to the candidate material resource; and
   determining a similarity between a semantic vector corresponding to a paragraph in the commentary and a semantic vector corresponding to a candidate material resource in the candidate material resource set as a degree of matching between the paragraph and the candidate material resource.

9. The method according to claim 8, wherein the determining, for each candidate material resource in the candidate material resource set, a semantic vector corresponding to the candidate material resource comprises:
   semantically segmenting, in response to determining that the candidate material resource is an image, the image candidate material resource to obtain at least one semantic labeling result corresponding to the image candidate material resource, and determining the semantic vector corresponding to the candidate material resource based on semantic vectors corresponding to semantic labeling results among the obtained at least one semantic labeling result;

down sampling, in response to determining that the candidate material resource is a video, the video candidate material resource to obtain at least one sample image;

for each sample image in the at least one sample image, semantically segmenting the sample image to obtain at least one semantic labeling result corresponding to the sample image, and determining a semantic vector corresponding to the sample image based on semantic vectors corresponding to semantic labeling results among the obtained at least one semantic labeling result; and determining the semantic vector corresponding to the candidate material resource based on semantic vectors corresponding to sample images.

10. The method according to claim 9, wherein the determining the semantic vector corresponding to the candidate material resource based on the semantic vectors corresponding to sample images comprises:

determining a mean vector of the semantic vectors corresponding to the respective sample images as the semantic vector corresponding to the candidate material resource.

11. The method according to claim 10, wherein the determining the semantic vector corresponding to the candidate material resource based on the semantic vectors corresponding to sample images comprises:

determining a vector corresponding to medians of values at respective dimensions of the semantic vectors corresponding to the respective sample images as the semantic vector corresponding to the candidate material resource.

12. An apparatus for generating information, comprising:
at least one processor; and
a memory storing instructions, the instructions when executed by the at least one processor, cause the at least one processor to perform operations, the operations comprising:

determining at least one video segment obtained by semantically segmenting videos comprised in a target news cluster as a target video set, wherein respective pieces of news in the target news cluster direct to a given news event;

determining a commentary for the target news cluster;

determining, based on the target video set and a target image set, a candidate material resource set corresponding to the commentary, wherein the target image set is composed of respective images comprised in the target news cluster; and for each paragraph in the commentary, determining degrees of matching between the paragraph and each candidate material resources in the candidate material resource set.

13. The apparatus according to claim 12, wherein the operations further comprise:

determining a candidate material resource sequence corresponding to the paragraph in the commentary based on the degrees of matching between the paragraph in the commentary and the candidate material resources, playing durations of the candidate material resources, and a text length of the paragraph in the commentary; and generating a video corresponding to the commentary based on the candidate material resource sequences corresponding to paragraphs in the commentary.

14. The apparatus according to claim 13, wherein the operations further comprise:

sending the video corresponding to the commentary to a terminal device, so that the terminal device presents the received video.

15. The apparatus according to claim 14, wherein the generating a video corresponding to the commentary based on the candidate material resource sequences corresponding to paragraphs in the commentary comprises:

for each paragraph in the commentary, generating a speech corresponding to the paragraph by using a speech synthesis technology; and generating the video corresponding to the commentary based on speeches corresponding to the paragraphs in the commentary and the candidate material resource sequences.

16. The apparatus according to claim 15, wherein the determining, based on the target video set and a target image set, a candidate material resource set corresponding to the commentary comprises:

combining the target video set and the target image set to obtain the candidate material resource set corresponding to the commentary.

17. The apparatus according to claim 15, wherein the determining, based on the target video set and a target image set, a candidate material resource set corresponding to the commentary comprises:

for each target video in the target video set, inputting the target video into a pre-trained vivid video detecting model to obtain a vivid video detecting result corresponding to the target video, wherein the vivid video detecting model is used to characterize a corresponding relationship between a video and a vivid video detecting result for characterizing whether the video is a vivid video;

deleting a target video corresponding to a vivid video detecting result for characterizing a non-vivid video from the target video set; and combining the target video set and the target image set to obtain the candidate material resource set corresponding to the commentary.

18. The apparatus according to claim 17, wherein the operations further comprise:

deleting a video with a playing duration shorter than a preset shortest candidate video duration from the target video set, after deleting a target video corresponding to a vivid video detecting results for characterizing a non-vivid video from the target video set.

19. The apparatus according to claim 15, wherein the determining, for each paragraph in the commentary, degrees of matching between the paragraph and candidate material resources in the candidate material resource set comprises:

for each paragraph in the commentary, determining a semantic vector corresponding to the paragraph;

for each candidate material resource in the candidate material resource set, determining a semantic vector corresponding to the candidate material resource; and determining a similarity between a semantic vector corresponding to a paragraph in the commentary and a semantic vector corresponding to a candidate material resource in the candidate material resource set as a degree of matching between the paragraph and the candidate material resource.

20. A non-transitory computer-readable storage medium, storing a computer program thereon, wherein the computer program, when executed by one or more processors, causes the one or more processors to implement operations, the operations comprising:

determining at least one video segment obtained by semantically segmenting videos comprised in a target news cluster as a target video set, wherein respective pieces of news in the target news cluster direct to a given news event;

determining a commentary for the target news cluster;

determining, based on the target video set and a target image set, a candidate material resource set corresponding to the commentary, wherein the target image set is composed of respective images comprised in the target news cluster; and for each paragraph in the commentary, determining degrees of matching between the paragraph and candidate material resources in the candidate material resource set.

* * * * *